United States Patent Office 3,510,259
Patented May 5, 1970

---

3,510,259
SIMULTANEOUS LEACHING OF ZINC
AND MANGANESE ORES
Peter Kenneth Everett, Toronto, Ontario, Canada, assignor to Union Carbide Canada Limited, Toronto, Ontario, Canada, a Canadian company
No Drawing. Filed July 13, 1967, Ser. No. 653,016
Int. Cl. C22b 3/00
U.S. Cl. 23—117   9 Claims

ABSTRACT OF THE DISCLOSURE

Ores containing zinc sulfide and manganese sulfate are leached simultaneously in sulfuric acid in the presence of a catalyst selected from the group consisting of ionic iron and ionic copper according to the reaction:

$$MnO_2 + ZnS + 2H_2SO_4 \rightarrow MnSO_4 + ZnSO_4 + ZnSO_4 + 2H_2O + S^\circ$$

---

This invention relates to the simultaneous leaching of zinc and manganese ores in a solution of sulphuric acid, to produce a solution containing zinc sulphate and manganese sulphate. More specifically, the ores employed contain zinc in the form of ZnS and manganese in the form of $MnO_2$.

The process according to this invention is particularly useful in relation to the process described in Canadian patent application No. 973,828, filed on Oct. 22, 1966, in the name of Union Carbide Canada Limited. In the aforementioned patent application there is described a low-cost method for simultaneously refining zinc and battery-grade gamma-type electrolytic manganese dioxide. The practice of the latter invention requires an electrolyte containing from about 0.5 to about 2.6 moles of each of $ZnSO_4$ and $MnSO_4$ per litre.

The conventional process for obtaining a zinc sulphate solution starting with the zinc sulphide ore is first to roast it to the oxide, and subsequently to dissolve the zinc oxide in sulphuric acid.

Among the factors that affect the economics of the conventional process for obtaining a zinc sulphate solution starting with zinc sulphide ore are the following:

(a) A high iron content in the ore results in the production of insoluble ferrites during roasting and results in poor zinc recovery;

(b) Sulphur dioxide is produced during the roasting, and must be disposed of in some manner, such as making sulphuric acid.

A more direct method is described in Canadian Patent No. 618,623, to Foreward. The Foreward method involves the direct leaching of zinc sulphide concentrate with sulphuric acid and oxygen under pressure. This process has the advantage that sulphur is recovered in the elemental form and the problem of $SO_2$ disposal are eliminated.

The conventional method for producing a manganese sulphate solution for the production of battery grade electrolytic manganese dioxide is first to calcine natural $MnO_2$ ore in a reducing atmosphere to convert it to MnO, and then to leach the MnO with $H_2SO_4$ to produce a manganese sulphate solution.

It is an object of this invention to provide a process for producing, from zinc sulphide and manganese dioxide ores, a solution containing zinc sulphate and manganese sulphate.

It is a further object of this invention to provide a process which has the important advantage of simplicity over both of the conventional methods described above.

Basically, the process of this invention involves a direct atmospheric pressure leach in which zinc sulphide and manganese dioxide ores are leached simultaneously with sulphuric acid. The overall reaction may be represented by the following equation.

$$MnO_2 + ZnS + 2H_2SO_4 \rightarrow MnSO_4 + ZnSO_4 + 2H_2O - S^\circ$$

In this process the manganese dioxide provides the oxidizing power necessary for the oxidation of the zinc sulphide. As in the Foreward process, the sulphur is recovered as elemental sulphur.

More specifically, this invention provides a process for producing a solution of manganese sulphate and zinc sulphate from manganese dioxide ore and zinc sulphide ore, said process comprising the steps of: leaching said ores in a sulphuric acid solution containing a suitable catalyst according to the overall reaction:

$$MnO_2 + ZnS + 2H_2SO_4 \rightarrow MnSO_4 + ZnSO_4 + 2H_2O + S^\circ$$

As can be seen, this process eliminates the necessity for providing roasting facilities and facilities for recovery of $SO_2$ or a pressure autoclave as required in the direct oxidation process. Further simplification results from the elimination of the calcining step in the conventional process of the production of a manganese sulphate solution.

The basic reaction can be considered as follows:

$$ZnS - 2e \rightarrow Zn^{++} + S^\circ$$
$$MnO_2 + 4H^+ + 2e \rightarrow Mn^{++} + 2H_2O$$

The ZnS and the $MnO_2$ are converted to Zn and Mn ions and elemental sulphur in an acid-consuming reaction. The ZnS is oxidized and the $MnO_2$ is reduced. Neither one would go into solution to any extent without the presence of the other, suggesting the overall reaction:

$$ZnS + MnO_2 + 4H^+ \rightarrow Zn^{++} + Mn^{++} + S^\circ + 2H_2O$$

Nonetheless, the reaction between pure zinc sulphide and manganese dioxide in sulphuric acid is very slow, due to their extremely low solubility. To make the reaction occur at any reasonable speed a catalyst is needed. Iron is the most important catalytic agent in the present invention, since it is almost always present in the ore. If neither ore contains iron, it can be added separately to the leach solution.

The catalytic function of ionic iron in the present reaction is believed to be as follows. Ferrous iron ($Fe^{++}$) is oxidized to the ferric form ($Fe^{+++}$) by the manganese dioxide, while the manganese dioxide is reduced from the insoluble tetravalent form to the soluble di-valent form. The equation for the reaction is as follows:

$$2Fe^{++} + MnO_2 + 4H^+ \rightarrow 2Fe^{+++} + Mn^{++} + 2H_2O$$

The ferric iron remains in solution provided the pH is kept below about 2.5, and in this condition the ferric iron will react with the zinc sulphide as follows:

$$ZnS + 2Fe^{+++} \rightarrow Zn^{++} + S^\circ + 2Fe^{++}$$

It has been demonstrated that copper, and possibly other ions, will fill the same catalytic function in the present process as does iron.

Under stable leaching conditions, the latter two chemical reactions involving the catalytic effect of iron would continue simultaneously, with the effect of putting into solution equal amounts of the manganese ion and the zinc ion. However, intial experiments always resulted in more manganese is probably attributable to the fact that the iron sulphide, contained in the zinc sulphide ore, was reacting with manganese dioxide to release ionic iron according to the following reaction:

$$FeS + MnO_2 + 4H^+ = Fe^{++} + Mn^{++} + 2H_2O + S_0$$

Thus, for each mole of FeS present, 1.5 moles of $MnO_2$ are used up in oxidizing it to the ferric form.

The rates at which the above chemical reaction take place appear to be a function of the surface area of solids, hydrogen ion concentration, iron concentration and temperature.

The return electrolyte used for leaching will normally contain about 50 g.p.l. each of Zn, Mn and $H_2SO_4$. Virtually, any concentration of the above may be used so long as the saturation values are not exceeded. However, the conditions under which Zn and $MnO_2$ can be electrolysed will dictate a fairly narrow range. The concentration of ores in the leach reaction may vary upwardly from that theoretically required to neutralize the available acid. Since the reaction rate is proportional to the ore surface area, the concentration normally used is the maximum consistent with good solid-liquid separation and other physical properties of the mixture.

The relative surface areas of the two ores will determine whether the iron in solution is present as ferrous or ferric. The surface area is a function of the particle type, shape, size and the relative amounts of these two ores. Because the ferric ion tends to hydrolyse and precipitate as ferric hydroxide at a pH of 2.5 or higher, it may be considered desirable to keep the ionic iron in the ferrous form during the early stage of the reaction, and this is accomplished by using a fairly large excess of ZnS surface in the ore. On the other hand, there are reasons why it may be preferably to adjust the relative surface areas of ZnS and $MnO_2$ in the ores such that the iron is largely in the ferric form, and this will be explained more fully in conjunction with a further step in the present process, which is to be dealt with below.

If the leach reaction were permitted to proceed to a pH of from 2.5 to 3.0, $Fe(OH)_3$ flock would begin to form, as mentioned above. At between pH 3.0 and 4.0, silica would start to precipitate and the solution would become opaque. In this pH range, silica precipitates in the colloidal form, and results in gel formation. When this occurs, residues do not settle readily and the solutions become essentially impossible to filter. Classification and reaction rates are also adversely affected. On the other hand, if silica is precipitated at a pH of 4 or more, it is granular and separates and filters readily.

This extremely undesirable precipitation of silica in the collodial form at a pH of between 3.0 and 4.0 is avoided by a technique similar to reverse leaching in a conventional zinc plant. When the pH of the electrolyte (return electrolyte) during the leaching step reaches a pH of approximately 2.5, having been initially at a pH of about 0.5, the solution is separated from the ores, and is continuously added to neutral electrolyte of which the pH is approximately 4.5. When the electrolyte is separated from the ores, approximately 80% of the free acid has reacted. A pH of 4.5 is here considered "neutral," as this is the pH of a solution of $ZnSO_4$ containing no free acid.

The next step is to remove the iron from the solution as ferric hydroxide precipitated in an acid-forming reaction. How this is accomplished depends to some extent on whether the ionic iron is present in the ferrous form or in the ferric form. If the iron is largely ferrous, which would be the case where an excess of ZnS had been used in the leaching step, some procedure would have to be used to oxidize the ferrous iron to the ferric form, so that the ferric iron could hydrolyse and precipitate as ferric hydroxide (which would happen automatically at a pH of 4.45). One way of oxidizing the ferrous iron to the ferric form is to sparge the electrolyte with air, but this is a much slower method than using $MnO_2$, which can be added separately to the solution at this point. The use of $MnO_2$ to oxidize the ferrous iron, however, has the disadvantage that the ferric hydroxide tends to coat the $MnO_2$ particles, and a considerable amount of $MnO_2$ can be lost in the precipitate as a result. It may be desirable to use a combination of these two techniques.

Alternatively, if the ionic iron is present in the ferric form rather than the ferrous form, which can be arranged by adjusting the relative amounts of the ores as mentioned above, then it is not necessary to oxidize the ionic iron, and upon being introduced into the neutral electrolyte at a pH of 4.5, the ferric iron will immediately hydrolyse and precipitate as ferric hydroxide.

As ferric hydroxide is formed, the solution becomes more acidic, and the last step in the process is to counter this acid-forming reaction by adding a material chosen from the following group: CaO, $CaCO_3$, ZnO, $ZnCO_3$, MnO, NaOH, KOH, $MnCO_3$. Since the aim of this last step is primarily to neutralize the solution, it may be possible to use substances other than those in the foregoing list. The problem, however, is to use a material which will not build up and have an adverse effect on the subsequent electrolysis. Potassium and sodium salts are undesirable since they result in the formation of cryptomelane $8MnO_2 \cdot K_2O$, which is not too desirable for battery use. Calcium results in problems or gypsum precipitation. It is believed that ammonia would be undesirable, if the $MnO_2$ ultimately to be plated in accordance with the process taught in Canadian patent application No. 973,828 is intended for battery use.

The sulphur liberated in the reaction essentially remains in the ore residues, and can be removed if desired at a later date by conventional means, such as solvent extraction.

It is emphasized again that, in this type of leach reaction in which $MnO_2$ is used to oxidize ZnS, an imbalance of zinc and manganese concentrations is likely to develop over a number of cycles if there are present sufficient quantities of iron sulphides. When iron sulphides are present, they are oxidized by the $MnO_2$ in preference to the zinc sulphide. As a result, there is a gradual increase in the Mn:Zn ratio in the solution. This gradual imbalance can be countered in several ways.

One way would be, add calcined zinc ore (ZnO) plus sulphuric acid. These would react according to the normal reaction.

$$ZnO + H_2SO_4 \rightarrow ZnSO_4 + H_2O$$

If calcine is not available, the additional oxidizing power required for the solution of ZnS can be obtained by the re-cycle of ferric iron produced by the air oxidation of ferrous iron according to the following equations, $$2Fe^{++} + \tfrac{1}{2}O_2 + 2H^+ \rightarrow 2Fe^{+++} + H_2O$$
$$2Fe^{+++} + ZnS \rightarrow 2Fe^{++} + Zn^{++} + S^0$$

If added manganese is required it can be added either as MnO or $MnCO_3$ during the ferric hydroxide precipitation stage.

EXAMPLE

A leach reaction was carried out with ores mixed in equi-molar ratio, 250 grams, in 1.0 litre of return electrolyte at pH 0.5. The temperature was maintained at 90° C., and after 45 minutes of vigorous mechanical agitation the pH reached 2.4. The following are the analytical results:

| Reaction time | 0 min. | 5 min. | 10 min. | 15 min. | 30 min. | 45 min. |
|---|---|---|---|---|---|---|
| pH | 0.5 | 0.8 | 0.9 | 1.0 | 2.0 | 2.4 |
| Mn (g.p.l.) | 45 | 50 | 51 | 52 | 57 | 59 |
| Zn (g.p.l.) | 40 | 45 | 47 | 48 | 50 | 51 |
| $Fe^{++}$ (g.p.l.) | 0 | 0.3 | 0.3 | 0.7 | 1.0 | 1.3 |
| $Fe^{+++}$ (g.p.l.) | 0 | 0.8 | 1.0 | 0.5 | 0.3 | 0.1 |

Following completion of the reaction to pH 2.4, the unreacted ores were allowed to settle and the leach liquor containing some ferric precipitate was removed. It was then fed slowly on a continuous basis into neutral electrolyte at pH 4.5. The reactor was aerated by means of high speed agitation and the pH was maintained by the addition of ZnO. The discharge from the reactor was filtered to remove precipitated iron and silica.

Reactor pH—4.5 and 90° C.
Reaction temperature—90° C.
Residence time—3 hours
Aeration—By high speed agitator
ZnO—Added as required to maintain pH at 4.5
Inlet iron concentration—1.3 g.p.l.
Outlet iron concentration—0.015 g.p.l.

Most of the silica, aluminium, arsenic, antimony, germanium, tin and bismuth are thought to have been removed along with the ferric hydroxide precipitate. The remaining copper, cadmium and other heavy metals were subsequently removed by a conventional zinc dust purification.

While a preferred embodiment of this invention has been disclosed herein, those skilled in the art will appreciate that changes and modifications may be made therein without departing from the spirit and scope of this invention as defined in the appended claims.

I claim:

1. A process for producing a solution of manganese sulphate and zinc sulphate from manganese dioxide ore and zinc sulphide ore, said process comprising the steps of, leaching said ores in a sulphuric acid solution containing a suitable catalyst according to the overall reaction:

$$MnO_2 + ZnS + 2H_2SO_4 \rightarrow MnSO_4 + ZnSO_4 + 2H_2O + S°$$

2. A process as claimed in claim 1, in which the reaction is terminated at a pH of about 2.5.

3. A process as claimed in claim 1, in which the catalyst is ionic iron.

4. A process as claimed in claim 1, in which the catalyst is ionic copper.

5. A process for producing a solution of manganese sulphite and zinc sulphate from manganese dioxide ore and zinc sulphide ore, said process comprising the steps of:

leaching said ores in a sulphuric acid solution according to the overall reaction:

$$MnO_2 + ZnS + 2H_2SO_4 \rightarrow MnSO_4 + ZnSO_4 + 2H_2O + S°$$

ionic iron being present to catalyse the said reaction,
separating the solution from the ores when the pH is increased to approximately 2.5,
feeding said separated solution into a neutral electrolyte having a pH of approximately 4.5, thereby avoiding the pH range of 3.0 and 4.0 in which silica precipitates in colloidal form,
precipitating the ionic iron as ferric hydroxide in an acid forming reaction,
and countering said acid forming reaction by adding one selected from the group consisting of CaO, $CaCO_3$, ZnO, $ZnCO_3$, MnO, NaOH, KOH, $MnCO_3$.

6. A process as claimed in claim 5, in which the relative amounts of ZnS and $MnO_2$ involved in the leaching step are adjusted such that at the end of said leaching step, substantially all of the ionic iron is present in the ferric rather than the ferrous form.

7. A process as claimed in claim 5, in which at least some of the ionic iron is present in the ferrous form at the end of the leaching step, and in which the step of precipitating the ionic iron is preceded by oxidation of the ferrous iron to the ferric form, thereby to permit the formation of ferric hydroxide.

8. A process as claimed in claim 7, in which the oxidation of the ferrous iron to the ferric form is achieved by air sparging.

9. A process as claimed in claim 7, in which the oxidation of the ferrous iron to the ferric form is achieved by the addition of an oxidizing agent.

References Cited

UNITED STATES PATENTS

| 1,167,700 | 1/1916 | Laist et al. | 75—120 |
| 1,278,308 | 9/1918 | Cullen | 204—119 X |
| 3,227,520 | 1/1966 | Samonides | 23—117 |

OTHER REFERENCES

M. E. Wadsworth, editor, Unit Processes in Hydrometallurgy, Metallurgical Society Conference Papers, Gordon & Breach Scientific Publishers, New York, 1964, pp. 52, 53, 55, 56, 62, 64.

OSCAR R. VERTIZ, Primary Examiner
G. O. PETERS, Assistant Examiner

U.S. Cl. X.R.
23—125; 75—101, 115